United States Patent
Peterson et al.

(10) Patent No.: US 10,504,130 B2
(45) Date of Patent: Dec. 10, 2019

(54) METHODS AND SYSTEMS FOR INCENTIVIZING ONLINE RETAIL PURCHASERS TO ELICIT ADDITIONAL ONLINE SALES

(75) Inventors: Samuel J. Peterson, Salt Lake City, UT (US); Ryan C. Berger, Salt Lake City, UT (US)

(73) Assignee: OVERSTOCK.COM, INC., Salt Lake City, UT (US)

( * ) Notice: Subject to any disclaimer, the term of this patent is extended or adjusted under 35 U.S.C. 154(b) by 227 days.

(21) Appl. No.: 13/550,253

(22) Filed: Jul. 16, 2012

(65) Prior Publication Data

US 2013/0024260 A1      Jan. 24, 2013

Related U.S. Application Data

(60) Provisional application No. 61/511,112, filed on Jul. 24, 2011.

(51) Int. Cl.
*G06Q 30/02* (2012.01)

(52) U.S. Cl.
CPC .................. *G06Q 30/0208* (2013.01)

(58) Field of Classification Search
CPC . G06Q 30/00; G06Q 30/0207; G06Q 30/0222
USPC ............. 705/14.39, 14.3, 14.34, 14.27, 14.4; 434/127
See application file for complete search history.

(56) References Cited

U.S. PATENT DOCUMENTS

| | | | | |
|---|---|---|---|---|
| 2007/0190501 A1* | 8/2007 | Brown et al. | ................. | 434/127 |
| 2007/0219867 A1* | 9/2007 | Mehm | ............................. | 705/14 |
| 2008/0071622 A1* | 3/2008 | Walker et al. | .................. | 705/14 |
| 2008/0082420 A1* | 4/2008 | Kargman | ............... | G06Q 10/10 |
| | | | | 705/14.27 |
| 2010/0004978 A1* | 1/2010 | Pickard | ............. | G06Q 30/0241 |
| | | | | 705/14.4 |

* cited by examiner

*Primary Examiner* — Marilyn G Macasiano
(74) *Attorney, Agent, or Firm* — Dorsey & Whitney LLP (57) ABSTRACT

Various methods and systems are provided for conducting transactions, such as electronic transactions over the internet. In one embodiment, an offer for a specified product or service is made by an online provider or retailer. The offer may be made in connection with certain preliminary or qualifying conditions being met. A customer may accept the offer by purchasing the good or service identified and then be provided with an incentive to publicize their purchase in an effort to get others to consider purchasing the item and also, possibly, participate in the incentive program. Certain parameters are monitored after an individual has purchased the product, and, eventually, a determination is made as to what type of reward the purchaser(s) will receive, if any. Any reward earned in accordance with the incentive program is then provided to the purchaser(s).

20 Claims, 11 Drawing Sheets

METHODS AND SYSTEMS FOR INCENTIVIZING ONLINE RETAIL PURCHASERS TO ELICIT ADDITIONAL ONLINE SALES

CROSS-REFERENCE TO RELATED APPLICATIONS

The present application claims the benefit of U.S. Provisional Application No. 61/511,112, entitled METHODS AND SYSTEMS FOR CONDUCTING ONLINE RETAIL SALES, filed on Jul. 24, 2011, the disclosure of which is incorporated by reference herein in its entirety.

TECHNICAL FIELD

The present invention relates to electronic commerce and, more particularly, to methods, systems and programs for conducting and managing retail sales in an environment such as the internet.

BACKGROUND

Commercial transactions conducted through electronic communication (e.g., via the World Wide Web (the Web or the internet)), commonly known as "e-commerce," have become a significant segment of the global economy. In a typical e-commerce transaction, a user may access the internet by way of a communications device (e.g., a desktop or laptop computer, a smart phone, tablet or other internet enabled device) and accesses a retailer's or service provider's e-commerce website via the internet. Once the desired e-commerce website is located, the user may search the website for the desired good or service, either by conducting a search of the website or by paging through the website content such as by using menus or links provided on the website. The user may then add the desired product or service to a virtual "shopping cart" through selection of a graphical "button" or a link associated with a graphical or textual description of the good or service. The virtual shopping cart retains a listing of the user's intended purchases and the customer can continue "shopping" by exploring the website further and visiting other product pages.

After the user indicates that all intended purchases have been added to the virtual shopping cart, the e-commerce website presents a form to the user for the user to enter personal and payment information (e.g., name, address and credit card information). Once the payment information is approved, the website presents confirmation to the user that the transaction has been completed and may provide additional information regarding a delivery schedule or methodology.

E-commerce has been a benefit to new companies as well as to traditional "brick and mortar" companies. Virtually all companies have invested in some form of online presence. In some instances, they have established their own system for conducting e-commerce. In other instances, companies have offered their goods or services through a third party e-commerce system. Many companies do both.

Various systems and approaches have been implemented in an effort to make e-commerce ore user friendly and more inviting on the one hand, and more profitable and manageable on the other hand. Continual efforts are being made to improve the e-commerce experience including efforts to provide systems and methods that make the experience more effective and more profitable for those offering goods and services for sale.

SUMMARY OF THE DISCLOSURE

Various methods and systems are disclosed herein regarding e-commerce and conducting transactions. In accordance with one aspect of the invention, a method of conducting an e-commerce transaction is provided that includes offering an item for purchase, associating an incentive program with the item for purchase, providing a reward to an initial purchaser of the item for purchase if certain additional transaction parameters are met within a specified time period.

In accordance with one embodiment, the method may further comprise encouraging the initial purchaser of the item to publicize their purchase and attract additional potential purchasers.

In accordance with one embodiment, the method may further comprise providing a reward to subsequent purchasers of the item for purchase. Such may include enabling the initial purchaser to advertise their purchase by electronic mail or by way of a social media website.

In accordance with one embodiment, the reward for the subsequent purchasers is the same as the reward for the initial purchaser.

In one particular embodiment, the reward for the initial purchaser is greater in value than the reward for subsequent purchasers.

In accordance with one embodiment, the act of providing a reward to an initial purchaser includes providing a reward having a value that is associated with a total number of additional purchasers purchasing the item within the specified time period.

In accordance with one embodiment, the act of providing a reward to an initial purchaser includes providing a reward that is tied to the number of subsequent purchasers that associate a subsequent purchase with the initial purchaser's purchase.

In accordance with one embodiment, the act of providing a reward includes providing a discount on a purchase price of the item for purchase.

In accordance with one embodiment, the act of providing a reward includes giving store-credit to the initial purchaser.

In one embodiment, providing the reward may include providing a discount on further items purchased at the same time as the purchase of the item offered in conjunction with the incentive program.

In one embodiment, the value of the reward may be determined after the end of the specified time period.

In one embodiment, the initial purchaser, the subsequent purchasers, or both may be required to be a member of a loyalty club, or satisfy some other prerequisite condition to be eligible for the incentive program.

In one embodiment, feedback may be provided to one or more of the purchasers during commencement of the specified time period. For example, the amount of time left in the specified time period may be conveyed to the purchasers. In another example the number of purchases of the item featured in the incentive program may be conveyed to the purchasers.

In one embodiment, providing a reward to the initial purchaser includes providing store credit to the initial purchaser.

In one embodiment, requiring the subsequent purchaser to perform a qualifying act includes requiring the subsequent purchaser to do at least one act of the group consisting of joining a loyalty club, opening an account or joining a mailing list.

In accordance with another embodiment of the present invention, a system is provided, which may include a computing system or a network, wherein the system includes various components and software configured to carry out one or more of the various methods described herein.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

The present invention includes various embodiments directed to systems and methods for conducting e-commerce, or online transactions, such as retail sales. The systems and methods may include the use of a variety of communications devices and may be implemented using computing devices (including mobile computing devices) over a network, such as the internet, as will be described in additional detail below.

Figure 1:
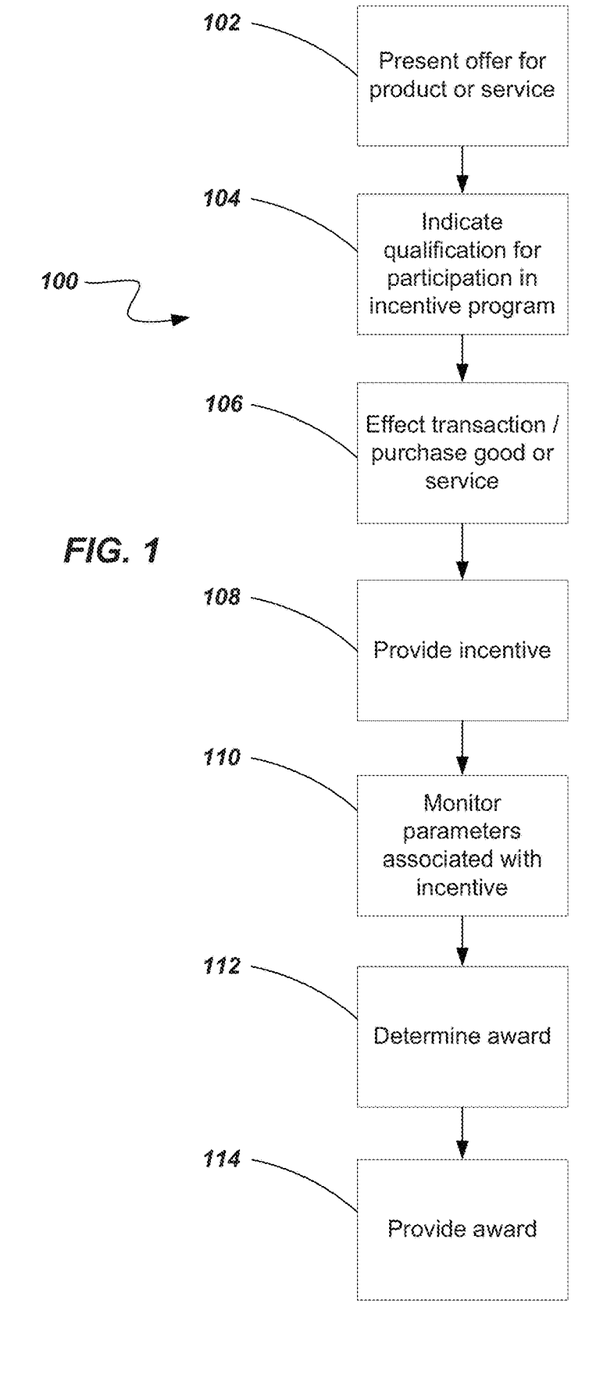
FIG. 1 is a flow diagram showing a method of conducting an e-commerce transaction in accordance with an embodiment of the present invention.

In accordance with one embodiment, a method and system is provided for conducting online transactions. Referring initially to FIG. 1, a flow chart depicts various acts that may be used in a process 100 in accordance with one embodiment of the present invention. In an initial act, as shown at 102, an offer for a specified product or service is made by an online provider or retailer. In one embodiment, the offer may be made in connection with certain preliminary or qualifying conditions being met. For example, the offer may be made to select group of individuals that have pre-qualified in some way, such as by participating in a rewards club or other loyalty program of the provider. In another embodiment, no pre-qualifying condition need be met, and the offer may be made to any interested party. The particular offer may be identified prior to purchase, as qualifying for participation in a particular program as indicated at 104. In another embodiment, the notice of qualifying for participation in a particular program may only be given after a customer commits to purchasing the good or service set forth in the offer.

A customer may accept the offer by purchasing the good or service identified, as indicated at 106, and then be provided with an incentive to publicize their purchase in an effort to get others to consider purchasing the item and also, possibly, participate in the incentive program as indicated at 108. It is noted that others purchasing the good or service which is the subject of the incentive program need not participate in the incentive program itself. In other words, if a prequalification is required to participate in the incentive program, someone might still purchase the specified good or service after learning about it from a friend or other source without having to satisfy the prequalification requirements, although they will not gain the benefits of the incentive program.

Certain parameters are monitored after an individual has purchased the product, as indicated at 110 and, eventually, a determination is made as to what type of reward the purchaser receives, if any, as indicated at 112. As indicated at 114, any reward earned in accordance with the incentive program is then provided to the purchaser.

An incentive provided to a purchaser may be structured in a variety of ways. For example, in one embodiment, the incentive may include a price reduction based on the number of people that order the same good or service within a specified time frame. One specific example might include an individual buying an item with the incentive that, if 25 more people buy the same item within the next two hours, everyone that bought the item within that time frame (including the initial buyer) will receive an additional 20% off of the purchase price. Such an incentive will motivate a purchaser (and subsequent purchasers of the item within the specified time frame) to publicize their purchase and the availability of the incentive program. Such publication of their purchase may occur, for example, by way of posting information about their purchase, and the associated incentive program, on a social network page (e.g., Facebook, Google+ or Myspace page), by "tweeting" (providing a post on Twitter), by "blogging" about the purchase on their personal web page or "blog," by texting, e-mailing, calling associates or by other means of communication. Thus, by publicizing their purchase and the associated potential savings (or other reward) that may be available, a purchaser may increase the likelihood that the threshold number of purchasers required to effect the stated savings or other reward will be met.

In another variation of implementing the incentive program, a scale of potential savings may be offered. For example, if 25 people purchase within the next 2 hours, a 20% savings off of the purchase price will be realized, if 50 people purchase within the same time frame (or within a different specified time frame), all those purchasing the item within the specified time period will realize 40% savings off of the original purchase price (i.e., the price that the purchaser originally paid for the item). Of course, this scale could be extended and modified a variety of ways with respect to the amount of items sold, the amount by which the purchase price will be reduced (or the size of the reward being enhanced), and the time period allotted before the incentive program expires or is no longer valid.

The specified reduction in purchase price (e.g., 20% off) may also be provided to the purchaser in a variety of ways. For example, if the time frame for the purchase is relatively short, an individual's credit card may not be charged for the original transaction until the time period has lapsed and the final price of the product has been determined based on the incentive offered and the total number of people purchasing within the specified time frame. In another embodiment, the original purchase price may be charged to the purchaser's credit card and the discount or savings earned through the incentive program may be provided in some other way. For example, the savings may be applied back to the purchaser's credit card. However, such transactions may be somewhat burdensome to track and implement. Thus, in other embodiments, the savings or discount may be provided, for example, as "in-store credit," "reward dollars" or as "points" that may be redeemed through the retailer's website. The credits or points may be tracked, for example, in association with a purchaser's profile or account established in association with the purchaser's activity on the provider's website. A purchaser may then save up the points or credits and use them in any way that they wish (in accordance with a retailer's or service provider's rewards policy) in future purchases other items from the provider's website, just as if the points or credits were cash or other legal tender. In another embodiment, the provider may offer additional opportunities to utilize the points or credits through other affiliate websites, through other retailers or service providers (via e-commerce means or otherwise) if the provider so desires.

Figure 2:
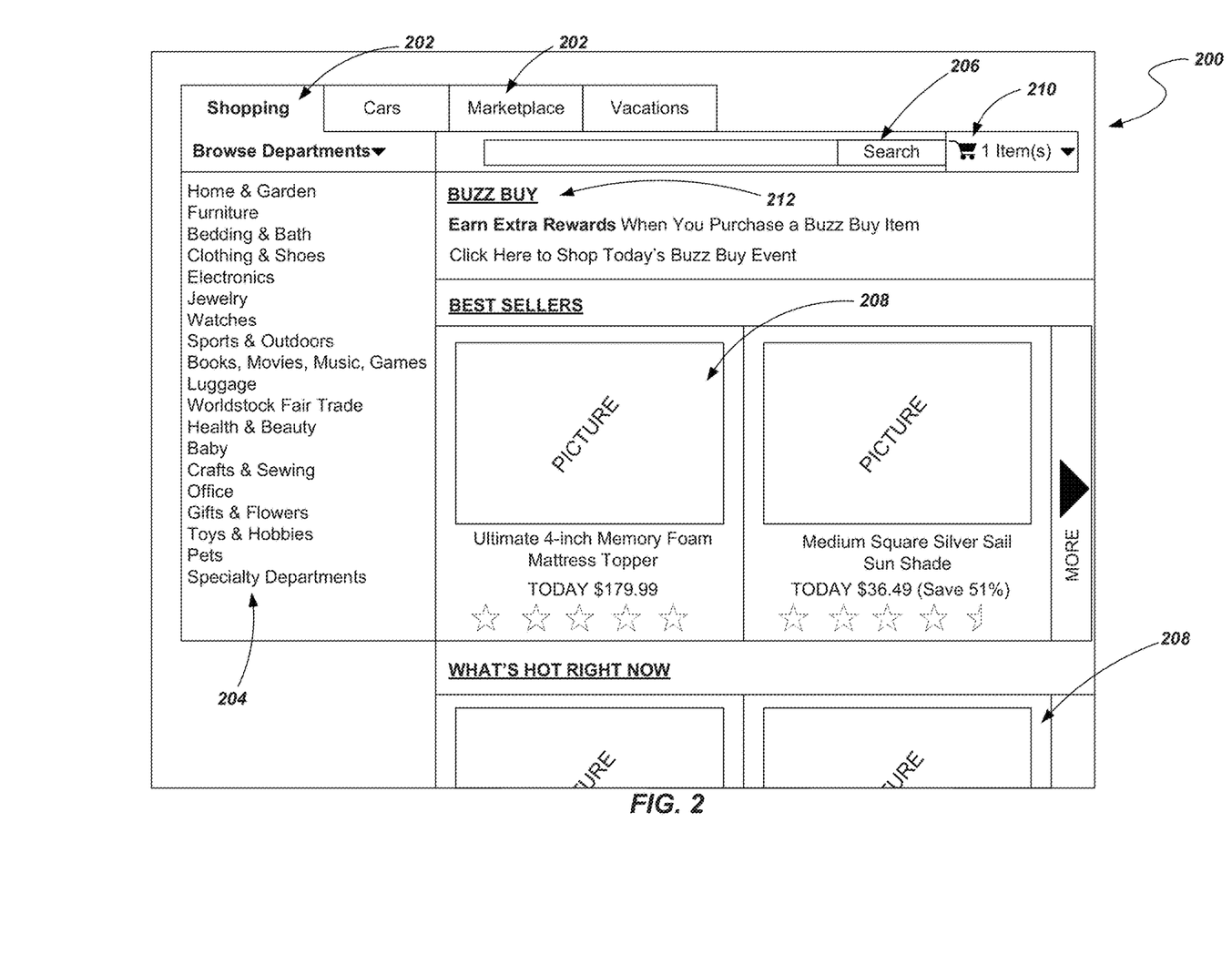
FIGS. 2-9 are screen shots showing examples of an implementation of an incentive program in accordance with the present invention.

Referring briefly to FIGS. 2-9, various depictions of web pages are illustrated as examples of what a potential purchaser might view in participating in an incentive program such as described hereinabove. For example, FIG. 2 shows a retailer's web page 200 indicating the availability of such an incentive program. The webpage 200 may include a variety of various features including, for example, category tabs 202, a department menu 204, a search option 206, retail products 208 available to purchase and a link to the consumer's virtual shopping cart 210 that "holds" items that the consumer wishes to purchase until the consumer is ready to "check out" and pay for their purchases. The webpage 200 may further include a link 212 (e.g., a hyperlink to another webpage associated with the program) that enables for a purchaser to access and participate in an incentive program. As noted on the webpage 200, the specific example of an incentive program shown in FIGS. 2-9 is referred to as a "Buzz Buy Event" where a purchaser may purchase a "Buzz Buy Item" (i.e., an item associated with an incentive program). Of course other nomenclature may be used in promoting such an incentive program to potential purchasers. Additionally, while not shown, a link may be provided for a purchaser to be notified (e.g., by e-mail or other appropriate means) regarding future Buzz Buy Events. Such notification could be tailored, if desired, to specific categories of products or services depending, for example, on preferences set forth in a purchaser's account or profile, or they may be tailored based on a purchaser's prior order history (or some combination of both).

Figure 3:
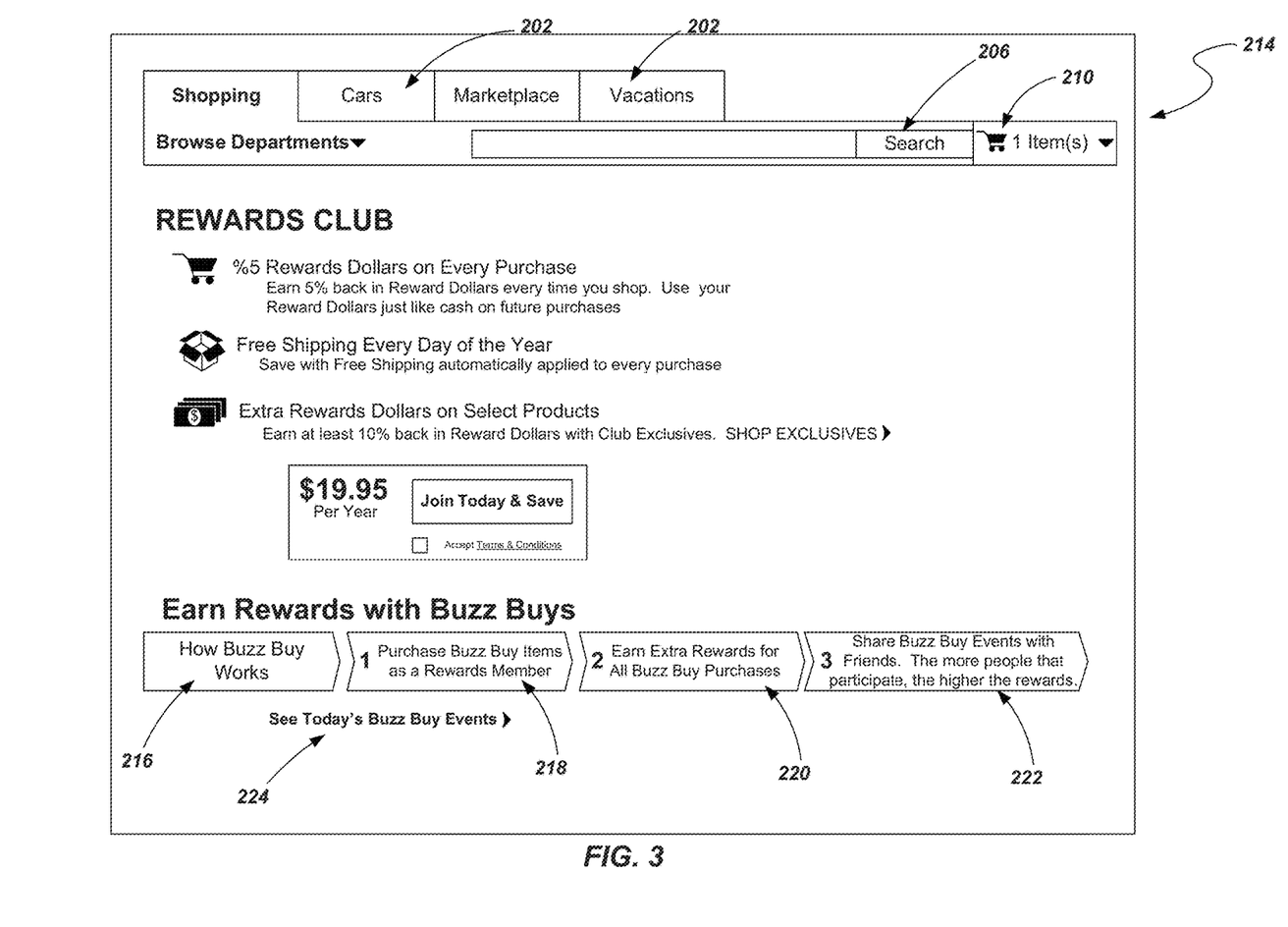

FIG. 3 depicts another web page 214 showing information provided to a potential purchaser regarding the Buzz Buy Event. For example a header 216 (or other text or graphical indicia) may introduce consumers to the incentive program with a statement such as "How Buzz Buy Works." Additional banners or information panels provide basic information about the program such as at 216 ("Purchase Buzz Buy items as a Rewards Member"), at 218 ("Earn Extra Rewards for all Buzz Buy event purchases.") and at 220 ("Share Buzz Buy Events Friends. The more people that participate, the higher the rewards."). Additionally, if only certain items are eligible for participation in the incentive program (or "Buzz Buy event") at a given time, a link 224 may be provided to the item or items that currently qualify for participation in the incentive program.

Figure 4:
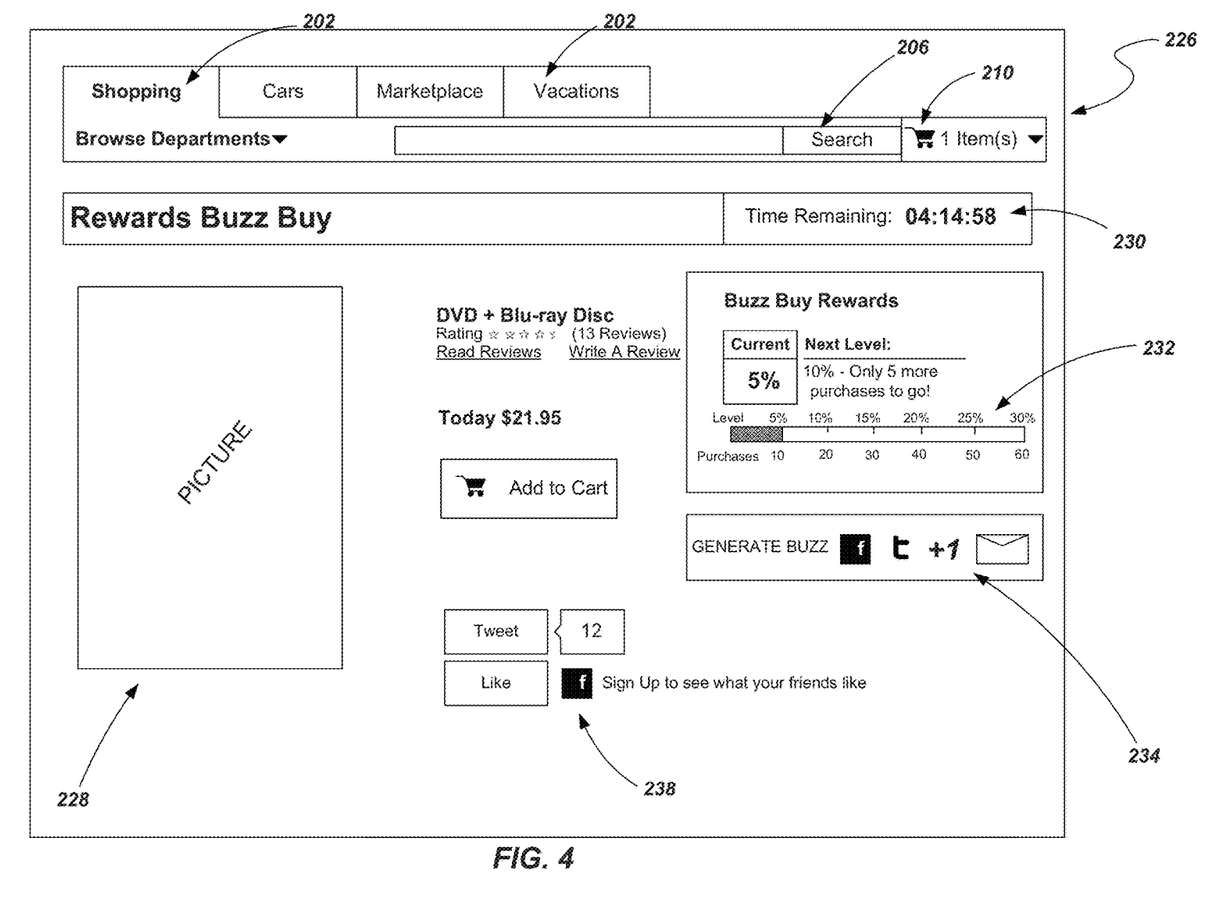

Referring to FIG. 4, an example of another web page 226 is shown for a "Buzz Buy" product—in this particular example a DVD. Along with various items of information 228 about the product, a timer 230 is shown indicating the amount of time left for which the product is available to be purchased using the incentive program (in this case, the "Buzz Buy event"). Additionally, a counter 232 is shown indicating the number of people that have ordered the qualifying product (the DVD) within the defined time period, and the associated reward (e.g., 10% off) that is associated with the number of people ordering the product. It is noted that the counter 232 provides an example of a scaled reward system noted above, wherein if 25 people order the DVD through the Buzz Buy event, a 10% discount or reward will be provided, if 50 people purchase the DVD, a 20% discount or reward will be provided, and if 75 people order the DVD, a 30% discount or reward will be provided. The scale could be established as a stepped discount (i.e., discounts/rewards change at specified milestones) or it may be a continuum, with the final number of people corresponding to a computed discount/reward based on a defined mathematical scale (e.g., linear, exponential, etc.).

Additionally shown on the web page 226 are links 234 that enable a consumer to share information about the Buzz Buy product with their friends. For example, such links 234 may include links that enable a consumer to share information by way of social media websites (e.g., Facebook, Twitter, Google +) or by way of e-mail or other messaging programs. Further, additional links 236 may provide a consumer to see what others are saying about the Buzz Buy Event (or associated products) by way of similar social media websites.

Figure 5:
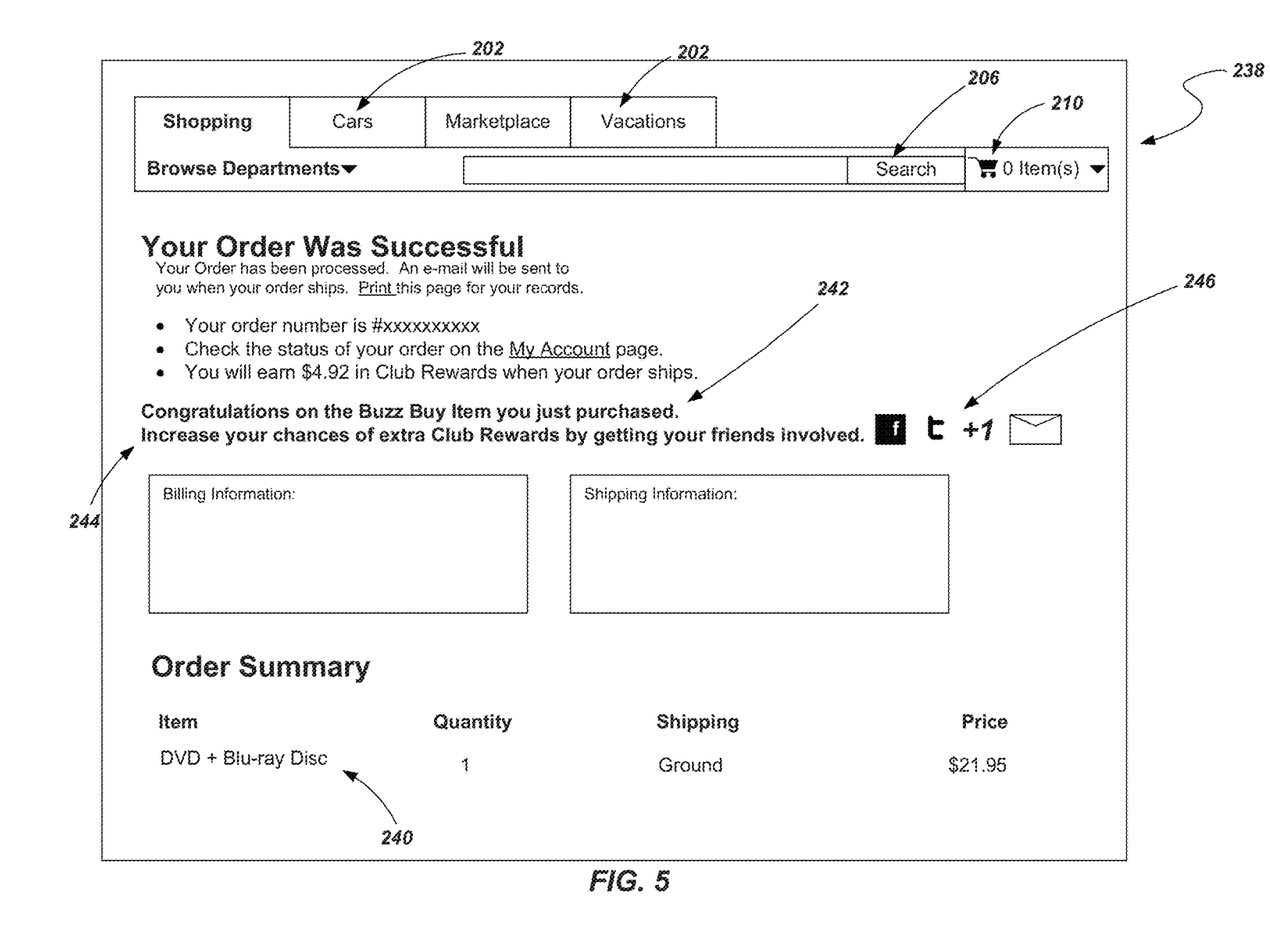

FIG. 5 is an example of an order confirmation web page 238 showing a first ordered item 240. While not explicitly shown, the web page 238 may show additional items that have been ordered by a purchaser. The confirmation web page also provides an indication 242 that the first ordered item 240 is a Buzz Buy (or incentive program) item. Additionally, a statement 244 may be provided to encourage the consumer to publicize their purchase ("Increase your chances of extra Club Rewards by getting your friends involved:") followed by links to popular social web sites or the purchasers e-mail program as indicated at 246. After purchase, a purchaser may return to the product page (see FIG. 4), to a profile page or some other web page, to monitor the timer and counter (230 and 232) if desired.

Figure 6:
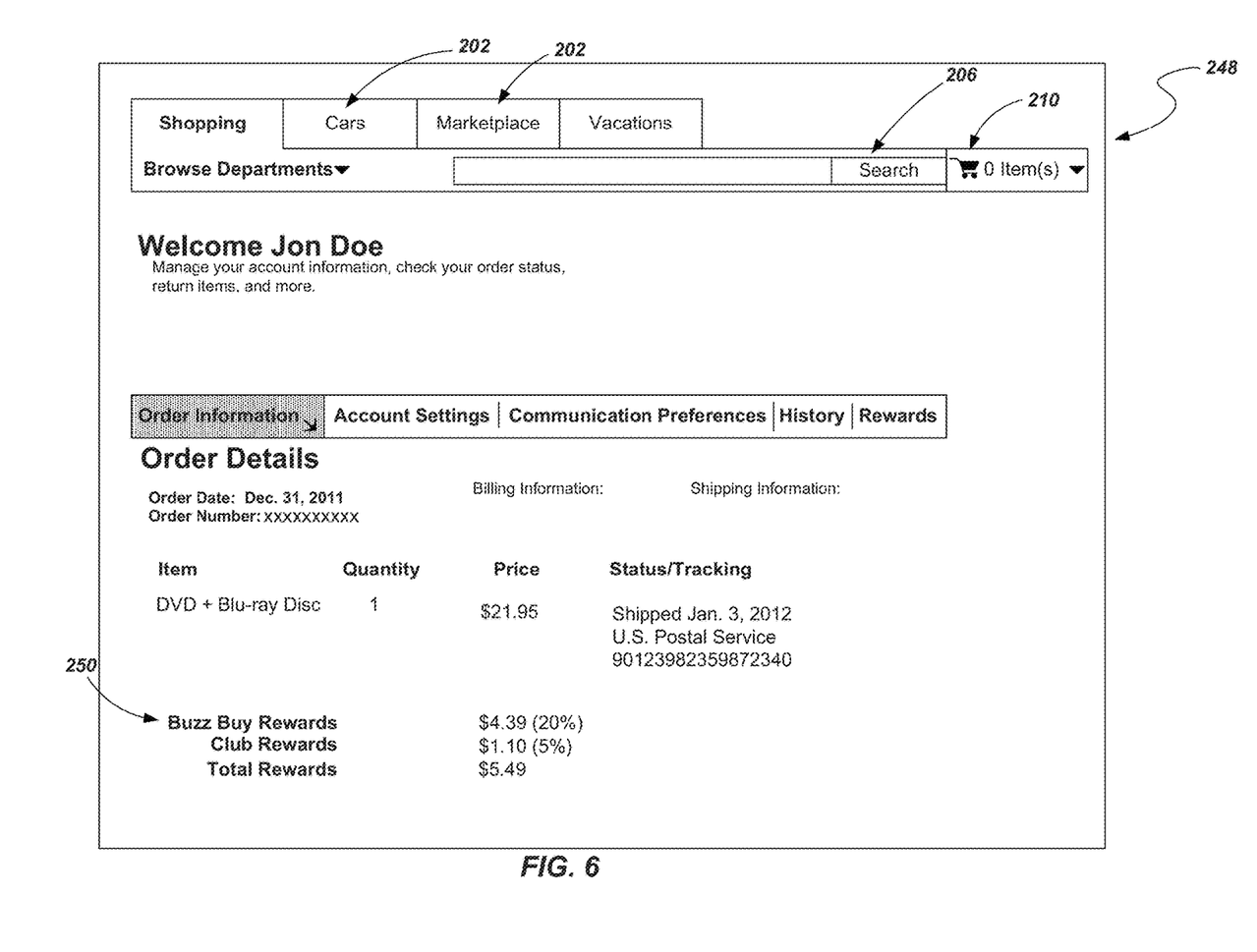

FIG. 6 is an example of a web page 248 showing final order details, including an indication 250 that an incentive program reward ("Buzz Buy" reward) was earned on the item—in this case 20% of the Buzz Buy item price or $4.39. It is noted that in other embodiments, a specified reward (e.g., % discount) might be offered with respect to the purchaser's order in association with some other program or qualification (e.g., a loyalty program). Thus, in the case shown in FIG. 6, it would be an additional 5% off of the purchaser's order. In other embodiments, other rewards may also be provided. For example, in one embodiment if a consumer purchases a Buzz Buy item, the same Buzz Buy reward (e.g., 20%) may be applied to one or more additional items that are being purchased at the same time. In such an embodiment, an upper limit could be established by the retailer (e.g., the entire order up to a certain multiple of the "Buzz Buy" item's original purchase price).

Other features and aspects may be further included in such a process if desired. For example, the retailer or service provider offering the incentive program may specify a ceiling for the number of orders that can participate in the incentive program (e.g., Buzz Buy Event), or they may leave it at an unspecified number for a specified period of time. In certain embodiments, club members, purchasers that have qualified in some other way, or consumers at large, may be permitted to influence the selection of products or services to be offered in the incentive program. For example, purchasers may be allowed to vote on categories of items, or even on specific items, to be included in a forthcoming incentive program. In one particular embodiment, individuals may qualify to vote on items by having participated in one or more previously conducted incentive programs within a defined period (e.g., participating in two Buzz Buy Events within the previous four weeks).

Other embodiments (and other variations of the above described embodiments) of incentive programs are also contemplated. For example, in one particular embodiment, it is contemplated that an incentive program be provided based on a purchaser's order, and ability to get others to "Buzz Buy" or become a "rider" on their order, rather than being associated with any specific product offering. In such an example, a purchaser may order a number of items (indeed, a minimum purchase threshold may be required in order to trigger the program) and then encouraged to publicize their purchase as discussed above. However, in this embodiment, the incentive may be that a specified number of people will be allowed to tack-on or become a rider to the original purchaser's order within a specified time frame, with each of those new purchasers obtaining a specified discount or reward. For example, the first 5 people to tack-on or become a rider to the original purchase, regardless of what items any of them may order or purchase, will receive 5% off their entire orders. On the other hand, if 5 people tack-one or become a rider to the original purchase, the original purchaser will receive some increased discount/reward (e.g., 20%), thereby providing substantial incentive for the original purchaser to publicize their purchase and attract other purchasers to the web site.

The incentive program may be further perpetuated by providing additional incentive to the first round of purchasers (e.g., the first five purchasers taking advantage of the incentive program as described above). In such a scenario, this first round of purchasers may obtain further discounts/rewards if each of them publicize and get a specified number (e.g., 5) of purchasers to tack-on to their order. This second round of purchasers may also provide a further benefit to the original purchaser by way of additional discounts/rewards. The rewards/benefits may continue to accrue to the original purchaser and the other various levels of purchasers until a specified limit is reached (e.g., 50% discount/reward for the original purchaser).

As noted above, such a program may include a specified time limit (e.g., two hours for the first round of purchasers to join). In another embodiment, a progressive timing scheme may be implemented. For example, the initial purchaser may be afforded an hour in which they are able to publicize and entice another purchaser to tack-on to the original order. With each tack-on order, the original purchaser may earn another unit of time (e.g., another hour) to obtain further orders. In one embodiment, this may continue until a specified number of tack-on orders is obtained, or until the time runs out.

Additionally, as with the embodiment described with respect to FIGS. 2-6, the rewards may be set up as a step function, or as a continuum. In other words, a specified level of discount/reward may not be recognized until a specific number of tack-on orders are achieved (e.g., if five tack-on orders are required, no discount/reward will be offered if only 4 orders are placed) in accordance with a specified step function. Or, alternatively, each individual tack-on order may represent an increase in rewards in accordance with a defined scale (linear or otherwise).

Figure 7:
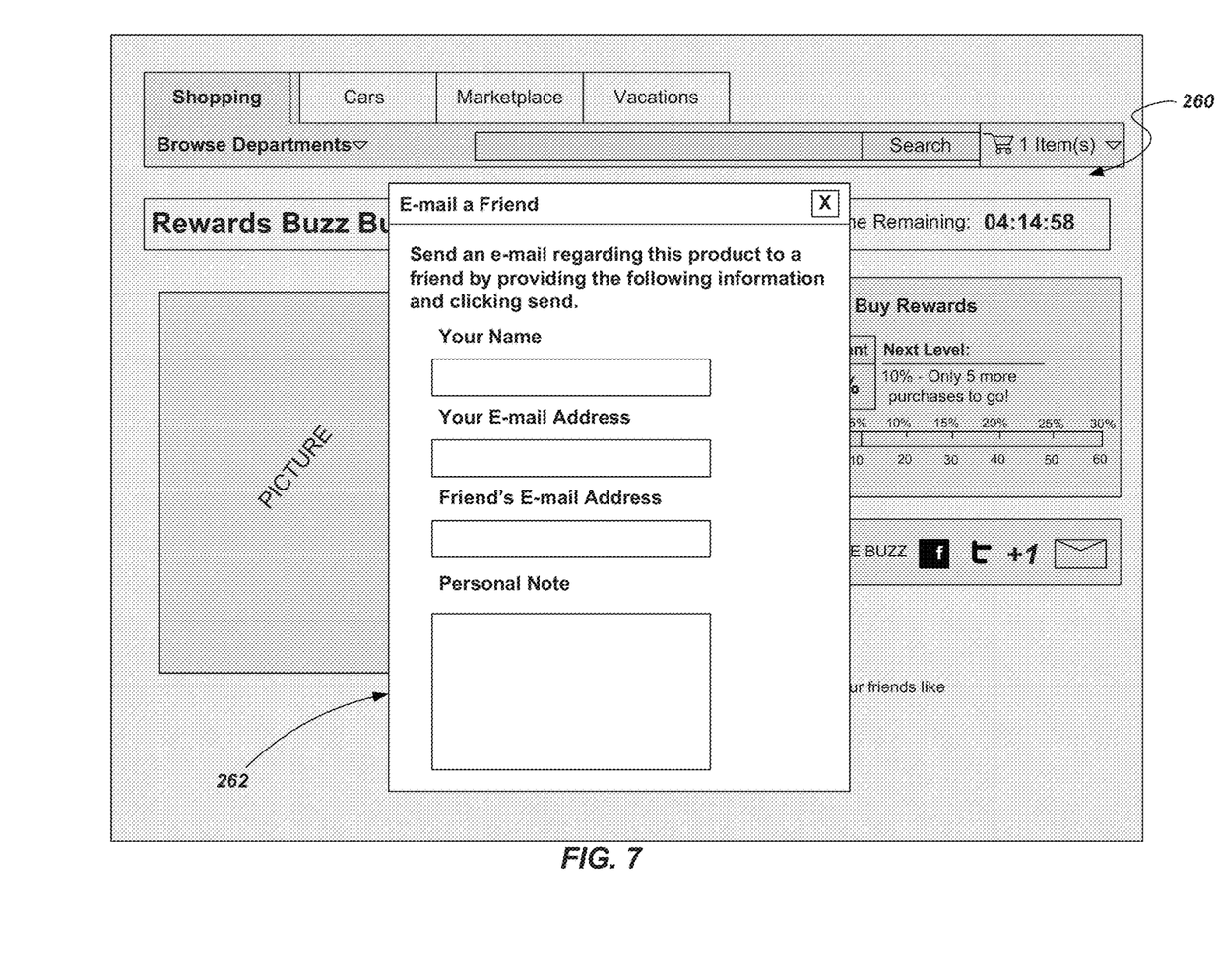
Figure 8:
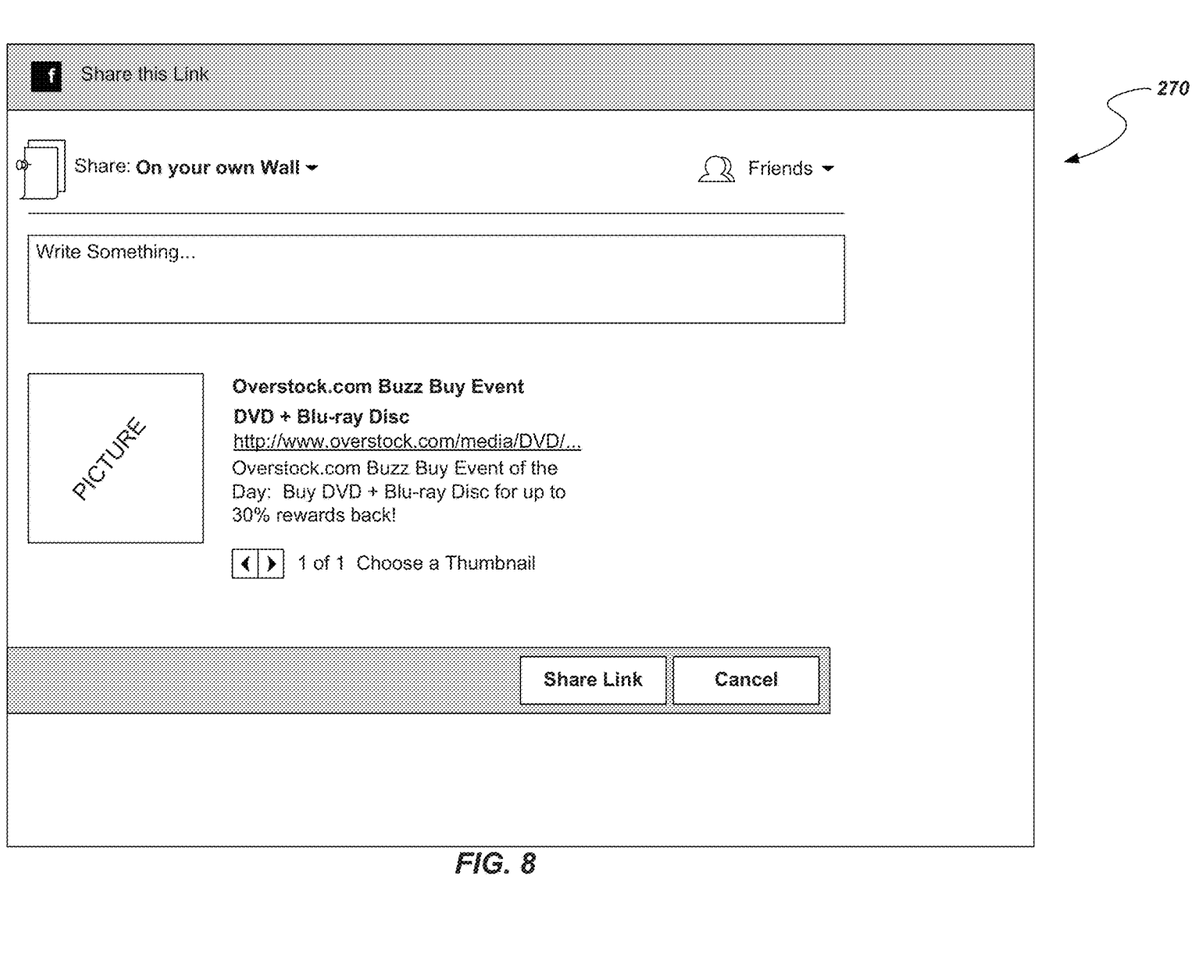
Figure 9:
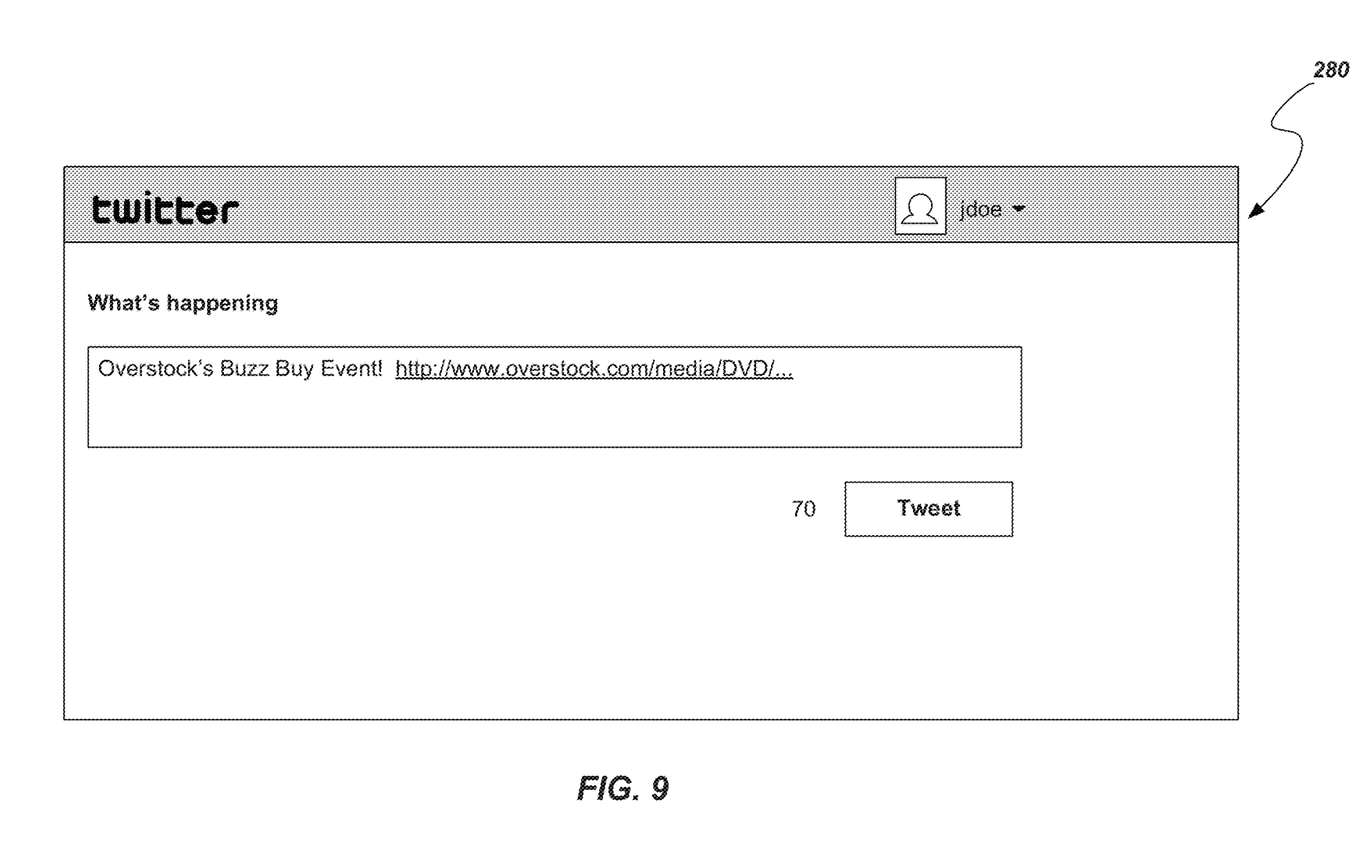

Referring briefly to FIG. 7, a web page 260 is shown with a dialogue box 262 enabling a purchaser to send an e-mail to one or more friends or acquaintances informing them of their recent purchase of a given product and of the retailer's incentive program (e.g., Buzz Buy Event) associated with the product. Similarly, with reference to FIG. 8, a dialogue box 270 is shown enabling the purchaser to post information about their purchase and the incentive program on a social media web page (e.g., a Facebook Wall). Another example is shown in FIG. 9, where a dialogue box 280 is shown in association with enabling the purchaser being able to post information about their purchase and the associated incentive program through a different social media website (i.e., Twitter). Of course, a variety of other web pages or dialogue boxes may be provided to enable a purchaser to announce their recent purchase as will be appreciated by those of ordinary skill in the art.

Figure 10:
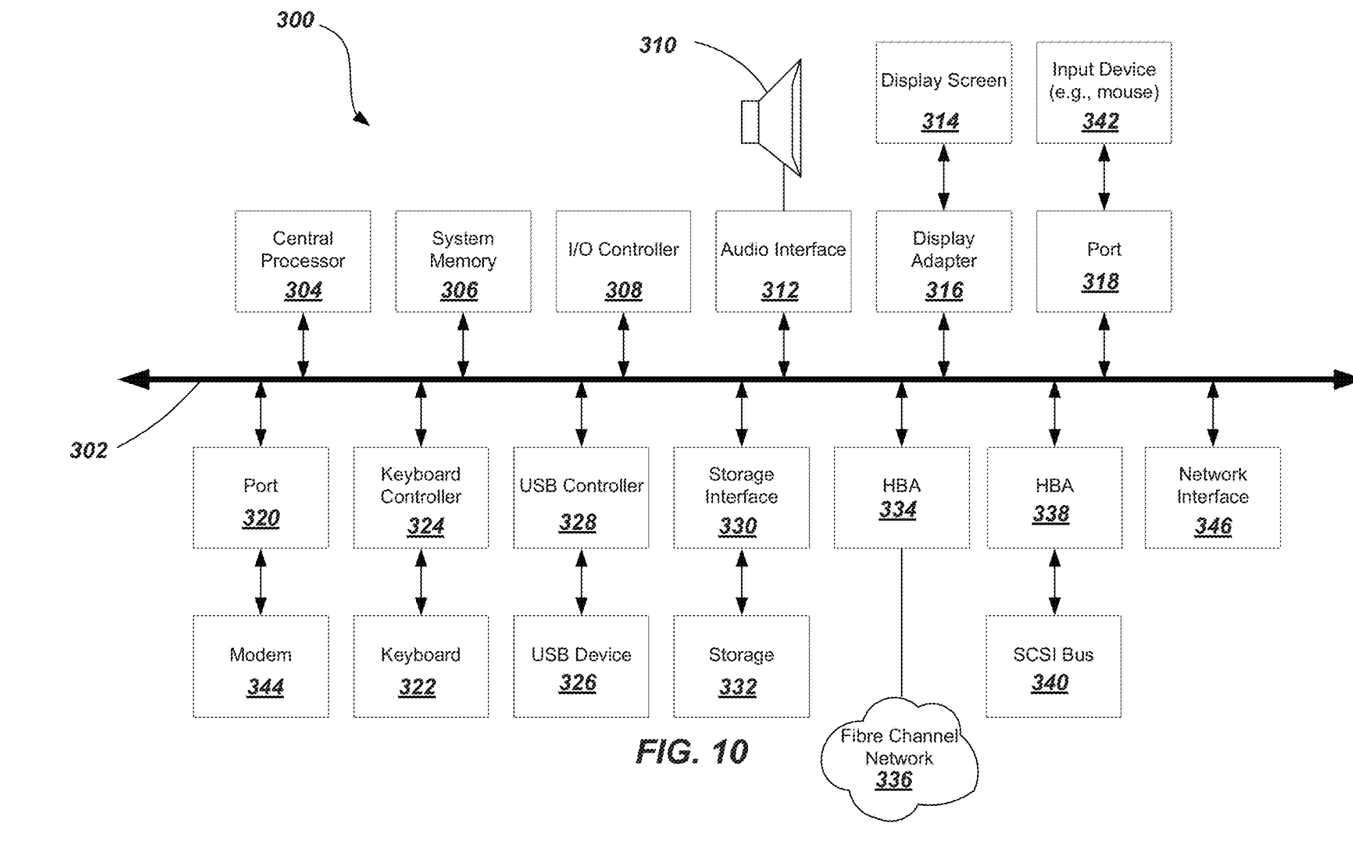
FIG. 10 is a diagram showing a computing system that may be used in accordance with one example embodiment of the present invention.
Figure 11:
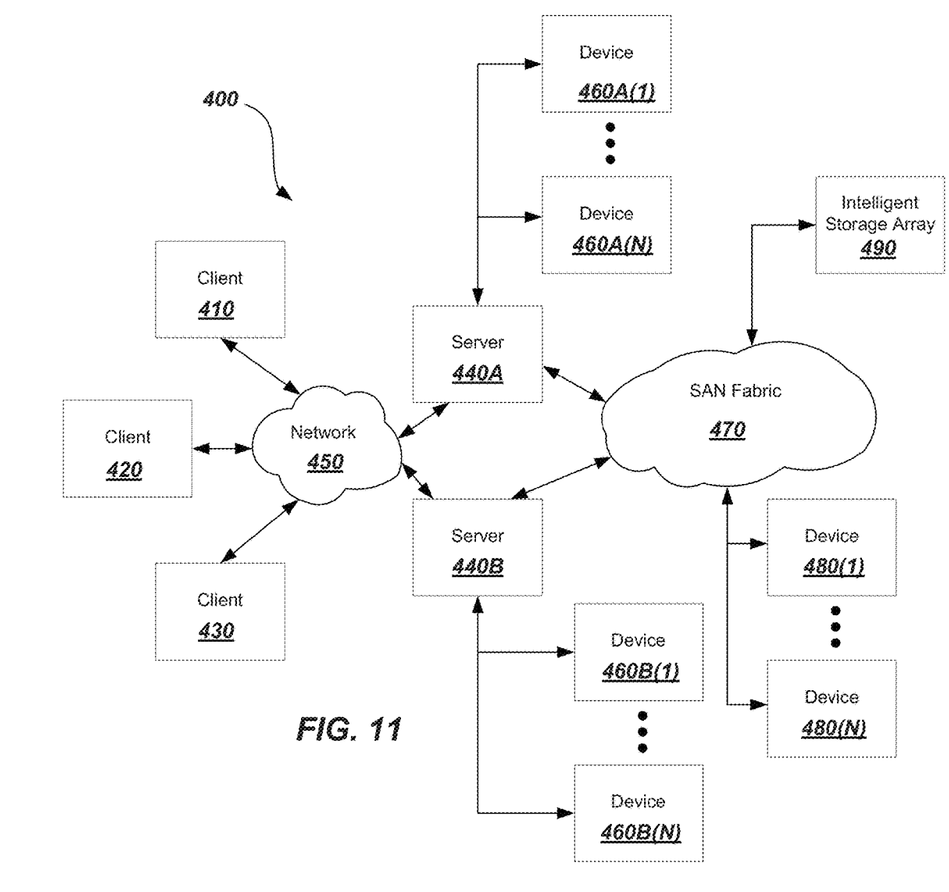
FIG. 11 is a diagram showing a network structure that may be used in accordance with one example embodiment of the present invention.

Referring now to FIGS. 10 and 11, diagrams are shown of examples of computing systems that may be utilized in implementing a method or process that may utilize the user interface described above. FIG. 10 depicts a block diagram of one example of a computer system 300 suitable for implementing the present systems and methods. Computer system 300 includes a bus 302 which interconnects major subsystems of computer system 300, such as a central processor 304, a system memory 306 (typically RAM, but which may also include ROM, flash RAM, or the like), an input/output controller 308, an external audio device, such as a speaker system 310 via an audio output interface 312, an external device, such as a display screen 314 via display adapter 316, serial ports 318 and 320, a keyboard 322 (interfaced with a keyboard controller 324), multiple USB devices 326 (interfaced with a USB controller 328), a storage interface 330, a storage device 332 (which may include a fixed disc, a floppy disc, an optical disc or other storage devices), a host bus adapter (HBA) interface card 334 operative to connect with a Fibre Channel network 336 and a host bus adapter (HBA) interface card 338 operative to connect to a SCSI bus 340. Also included are a user input devices 342 (e.g., a mouse or other point-and-click device—although such devices may also be coupled to the bus 302 via a USB controller 328), a modem 344 (coupled to bus 302 via port 320), and a network interface 346 (coupled directly to bus 302).

Bus 302 allows data communication between central processor 304 and system memory 306, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. Applications resident with computer system 300 are generally stored on and accessed via a computer readable medium, such as a hard disc drive, an optical drive, a floppy disk drive, a flash memory drive or other storage medium. Additionally, applications can be in the form of electronic signals modulated in accordance with the application and data communication technology when accessed via network modem 344 or network interface 346.

Storage interface 330, as with the other storage interfaces of computer system 300, can connect to a standard computer readable medium for storage and/or retrieval of information, such as a fixed disc drive. A fixed disk drive or other storage device may be a part of computer system 300 or may be separate and accessed through other interface systems. Modem 344 may provide a direct connection to a remote server via a telephone link or to the Internet via an internet service provider (ISP). Network interface 346 may provide a direct connection to a remote server via a direct network link to the Internet via a POP (point of presence). Network interface 346 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable medium such as one or more of system memory 306, a fixed disc, an optical disk, a floppy disc, a flash memory drive or some other storage device. The operating system provided on computer system 300 may be, for example, MS-DOS®, MS-WINDOWS®, iOS®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

FIG. 11 is a block diagram depicting a network architecture 400 in which client systems 410, 420 and 430, as well as storage servers 440A and 440B (any of which can be implemented using a computer system such as shown in FIG. 10, for example), are coupled to a network 450. In one embodiment, a program for implementing an incentive purchasing program (e.g., Buzz Buy) of a retailer's website may be located within a server 440A, 440B to implement the present systems and methods. The storage server 440A is further depicted as having storage devices 460A(1)-(N) directly attached, and storage server 440B is depicted with storage devices 460B(1)-(N) directly attached. SAN (storage area network) fabric 470 supports access to storage devices 480(1)-(N) by storage servers 440A and 440B, and so by client systems 410, 420, and 430 via network 450. An intelligent storage array 490 is also shown as an example of a specific storage device accessible via SAN fabric 470.

With reference to computer system 300 in FIG. 10, for example, a modem 344, a network interface 346 or some other method can be used to provide connectivity from each of client computer systems 410, 420, and 430 to network 450. Client systems 410, 420, and 430 are able to access information on storage server 440A or 440B using, for example, a web browser or other client software (not shown). Such a client allows client systems 410, 420, and 430 to access data hosted by storage server 440A or 440B or one of storage devices 460A(1)-(N), 460B(1)-(N), 480(1)-(N) or intelligent storage array 490. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of acts described and/or illustrated herein are given by way of example only and can be varied as desired. For example, while the acts illustrated and/or described herein may be shown or discussed in a particular order, these acts do not necessarily need to be performed in the order illustrated or discussed. The various exemplary methods described and/or illustrated herein may also omit one or more of the acts described or illustrated herein or include additional acts in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. It is additionally noted that the interface may be implemented in various forms including, for example, as a program implemented from a supplier's computing system that accesses data on the retailer's computing system or network; via the internet through a web browser; or through a retailer's server or network by way of a virtual private network that has been accessed by a supplier.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims. Additionally, features or aspects of one described embodiment may be combined with features or aspects of other embodiments without limitation.

What is claimed is:

1. A method of improving an e-commerce transaction over a computer network, the method comprising:
   prequalifying, by a processor of a computing system of the computer network, an initial purchaser for an incentive program including requiring the initial purchaser to be a member of a loyalty club to be eligible for the incentive program;
   offering an item for purchase via the computing system in communication with the computer network, the computing system providing electronic access to the item for purchase to one or more remote computing devices of the computer network via the Internet;

associating, by the processor, the incentive program with the item for purchase including providing a reward to the initial purchaser of the item for purchase if certain additional transaction parameters electronically associated with the item for purchase are met within a specified time period, the certain additional transaction parameters including electronically publishing the actual purchase of the item for purchase by the initial purchaser via the computing system, wherein the reward includes a discount to the initial purchaser and electronic links to offer the same discount to a limited number of subsequent purchasers regardless of the items purchased by the subsequent purchasers;

generating, by the processor, an order of the item made by the initial purchaser;

adding, by the processor, a unit of time to the specified time period up to a maximum time period responsive to each purchase of the item by one or more of the subsequent purchasers; and improving the e-commerce transaction at least by electronically tacking on each purchase of the item by the one or more subsequent purchasers to the order of the item made by the initial purchaser, via the computing system.

2. The method according to claim 1, further comprising providing a reward to subsequent purchasers of the item for purchase.

3. The method according to claim 2, wherein the reward for the subsequent purchasers is the same as the reward for the initial purchaser.

4. The method according to claim 2, wherein the reward for the subsequent purchasers is different from the reward for the initial purchaser.

5. The method according to claim 4, wherein the reward for the initial purchaser is greater in value than the reward for subsequent purchasers.

6. The method according to claim 1, wherein providing a reward to an initial purchaser includes providing a reward having a value that is associated with a total number of additional purchasers purchasing the item within the specified time period.

7. The method according to claim 1, wherein providing a reward to an initial purchaser includes providing a reward that is tied to the number of subsequent purchasers that associate a subsequent purchase with the initial purchaser's purchase.

8. The method according to claim 1, further comprising enabling the initial purchaser to advertise their purchase by electronic mail by providing a link to an electronic mail account of the initial purchaser.

9. The method according to claim 1, further comprising enabling the initial purchaser to advertise their purchase through a social media website by automatically generating and providing, via the computing system, a dialogue box that that is linked to a social media web page upon purchase of the item by the initial purchaser.

10. The method according to claim 1, further comprising providing an electronic notice encouraging any subsequent purchasers that purchase the item within the specified time period to advertise their purchase and attract further additional potential purchasers.

11. The method according to claim 1, wherein providing a reward includes providing a discount on a purchase price of the item for purchase by automatically generating and providing, via the computing system, an electronic notice of the discount.

12. The method according to claim 1, wherein providing a reward includes giving store-credit to the initial purchaser via the computer network.

13. The method according to claim 1, wherein providing the reward includes providing a discount on further items purchased concurrently with the purchase of the item offered in conjunction with the incentive program, by electronically linking the discount from the purchase of the item offered in conjunction with the incentive program with the items purchased concurrently therewith, via the computing system.

14. The method according to claim 1, further comprising electronically determining a value of the reward after the end of the specified time period, via the computing system.

15. The method according to claim 1, further comprising requiring any subsequent purchasers to be prequalified as members of the loyalty club to be eligible for the incentive program.

16. The method according to claim 1, further comprising providing feedback to at least the initial purchaser regarding the fulfillment of the additional transactional requirements during the commencement of the specified time period.

17. The method according to claim 16, wherein providing feedback includes providing information regarding an amount of time left in the specified time period.

18. The method according to claim 17, wherein providing feedback includes providing information regarding the current number of times the item offered for sale has been purchased within the specified time period.

19. The method according to claim 1, further comprising generating an electronic notification of the incentive program with the computing system after the item has been purchased such that the initial purchaser learns of the incentive program only after the item has been purchased.

20. The method according to claim 1, further comprising providing an electronic link enabling the initial purchaser to vote on future items for inclusion in future incentive programs.

* * * * *